United States Patent
Wu (10) Patent No.: US 12,238,721 B2
(45) Date of Patent: Feb. 25, 2025

(54) DATA TRANSMISSION METHOD AND TERMINAL DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 384 days.

(21) Appl. No.: 17/165,739

(22) Filed: Feb. 2, 2021

(65) Prior Publication Data

US 2021/0160858 A1  May 27, 2021

Related U.S. Application Data

(63) Continuation of application No. PCT/CN2019/098173, filed on Jul. 29, 2019.

(30) Foreign Application Priority Data

Aug. 7, 2018 (CN) .......................... 201810893243.0

(51) Int. Cl.
*H04W 72/21* (2023.01)
*H04W 28/02* (2009.01)
*H04W 74/0833* (2024.01)
*H04W 80/02* (2009.01)

(52) U.S. Cl.
CPC ....... *H04W 72/21* (2023.01); *H04W 28/0278* (2013.01); *H04W 74/0833* (2013.01); *H04W 80/02* (2013.01)

(58) Field of Classification Search
CPC ............. H04W 72/21; H04W 28/0278; H04W 74/0833
USPC .......................................................... 370/329
See application file for complete search history.

(56) References Cited

U.S. PATENT DOCUMENTS

2009/0323601 A1* 12/2009 Wu ..................... H04W 28/065
370/329
2014/0029408 A1*  1/2014 Yamamoto ............ H04L 1/1845
370/216
2018/0176937 A1*  6/2018 Chen ..................... H04W 72/21

FOREIGN PATENT DOCUMENTS

CN      106797401 A      5/2017
WO      2018083874 A1    5/2018

OTHER PUBLICATIONS

International Search Report issued in corresponding International Application No. PCT/CN2019/098173, mailed Oct. 28, 2019, 6 pages.

(Continued)

*Primary Examiner* — Chi Tang P Cheng
(74) *Attorney, Agent, or Firm* — IPX PLLC (57) ABSTRACT

Embodiments of this disclosure provide a data transmission method and a terminal device. The data transmission method includes receiving first uplink resource allocation information sent by a network side device. The first uplink resource allocation information is used to indicate a first uplink resource. The data transmission method further includes sending a first medium access control protocol data unit (MAC PDU) over the first uplink resource. The first MAC PDU is a PDU obtained through packet assembly on target data based on the first uplink resource. The target data includes at least data content of a second MAC PDU. The second MAC PDU is a previously generated MAC.

10 Claims, 3 Drawing Sheets

(56) References Cited

OTHER PUBLICATIONS

Ericsson, "UE switch from CBRA to CFRA and possible issues", 3GPP TSG-RAN WG2 AH 1807 R2-1810084, Jul. 6, 2018.
Ericsson, "Msg3 handling in early data transmission", 3GPP TSG-RAN WG2 #101 R2-1803073, Mar. 2, 2018, sections 1-3.
Ericsson, "Msg3 handling in early data transmission", 3GPP TSG-RAN WG2 #101bis R2-1805175, Apr. 20, 2018.
Huawei, "RACH procedure in early data transmission", 3GPP TSG RAN WG2 Meeting #100 R2-1713191, Dec. 1, 2017.
Keysight Technolgies UK, "Correction to NR MAC test case 7.1.1.3.2", 3GPP TSG RAN WG5 Meeting #79 R5-182564, May 25, 2018.

\* cited by examiner

DATA TRANSMISSION METHOD AND TERMINAL DEVICE

CROSS-REFERENCE TO RELATED APPLICATIONS

This application is a bypass continuation of PCT Application No. PCT/CN2019/098173 filed Jul. 29, 2019, which claims priority to Chinese Patent Application No. 201810893243.0, filed on Aug. 7, 2018 in China, both of which are incorporated herein by reference in their entireties.

TECHNICAL FIELD

The present disclosure relates to the field of communications technologies, and in particular, to a data transmission method and a terminal device.

BACKGROUND

When a medium access control (MAC) layer of user equipment (UE) receives an uplink resource, such as an uplink grant (Uplink Grant), the MAC layer of the UE needs to allocate the uplink resource to different data for use, assemble the data into a MAC protocol data unit (PDU) by using a multiplexing (Multiplexing) function, and then send the MAC PDU through a physical layer (PHY layer).

However, if the sizes of uplink resources successively received by the UE are different, a MAC PDU buffered by the UE in the previous time cannot be sent over an uplink resource this time, which may result in a loss of data packets. A random access procedure is taken as an example. When the UE performs a random access procedure, if a previous random access procedure is contention-based, the UE generates a MAC PDU and buffers it in an Msg3 buffer. When the UE initiates another random access procedure, the UE may initiate a non-contention-based random access procedure. In this case, the size of an uplink grant in an Msg2 received by the UE may change, and therefore a MAC PDU buffered previously in the Msg3 buffer cannot be sent over an uplink grant in an Msg2 this time, which may cause a loss of data packets. For a handover process, the handover may even fail due to the loss of data packets.

In the related art, no effective solution has been proposed for the problem of a data transmission loss caused by a change in the size of an uplink resource.

SUMMARY

Embodiments of the present disclosure provide a data transmission method and a terminal device, so as to reduce data transmission losses caused by a change in the size of an uplink resource.

To resolve the foregoing technical problem, the present disclosure is implemented as follows:

According to a first aspect, an embodiment of the present disclosure provides a data transmission method. The method includes:

receiving first uplink resource allocation information sent by a network side device, where the first uplink resource allocation information is used to indicate a first uplink resource; and sending a first MAC PDU over the first uplink resource, where the first MAC PDU is a PDU obtained through packet assembly on target data based on the first uplink resource, the target data includes at least data content of a second MAC PDU, and the second MAC PDU is a previously generated MAC PDU.

According to a second aspect, an embodiment of the present disclosure further provides a terminal device. The terminal device includes:

a receiving module, configured to receive first uplink resource allocation information sent by a network side device, where the first uplink resource allocation information is used to indicate a first uplink resource; and a sending module, configured to send a first MAC PDU over the first uplink resource, where the first MAC PDU is a PDU obtained through packet assembly on target data based on the first uplink resource, the target data includes at least data content of a second MAC PDU, and the second MAC PDU is a previously generated MAC PDU.

According to a third aspect, an embodiment of the present disclosure further provides a terminal device, including a processor, a memory, and a computer program stored in the memory and capable of running on the processor, where when the computer program is executed by the processor, the steps of the foregoing data transmission method are implemented.

According to a fourth aspect, an embodiment of the present disclosure further provides a computer-readable storage medium, where the computer-readable storage medium stores a computer program, and when the computer program is executed by a processor, the steps of the data transmission method are implemented.

In the embodiments of the present disclosure, first uplink resource allocation information sent by a network side device is received, where the first uplink resource allocation information is used to indicate a first uplink resource; and a first MAC PDU is sent over the first uplink resource, where the first MAC PDU is a PDU obtained through packet assembly on target data based on the first uplink resource, the target data includes at least data content of a second MAC PDU, and the second MAC PDU is a previously generated MAC PDU. In the case that the size of an uplink resource is changed, a PDU obtained through packet assembly based on data content of the previously generated MAC PDU can be transmitted, thereby reducing data transmission losses caused by the change of the size of the uplink resource, and improving the reliability of data transmission.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. For ease of description, the following describes some terms used in the embodiments of the present disclosure.

MAC layer protocol data unit (Protocol Data Unit, PDU) packet assembly:

When a MAC layer of UE receives an uplink resource, such as an Uplink Grant, the MAC layer of the UE needs to allocate the uplink resource to different data for use, assemble the data into a MAC PDU by using a Multiplexing function, and then send the MAC PDU through a PHY layer.

The MAC layer allocating the Uplink Grant to different data for use is controlled according to the order of priorities of different logical channels. After receiving the uplink grant, the MAC layer performs a logical channel prioritization LCP process, and the order of the priorities of the logical channels is as follows:

- a cell radio network temporary identifier (C-RNTI) MAC control element or data from a UL-CCCH channel (C-RNTI MAC CE or data from UL-CCCH);
- a configured grant confirmation MAC control element (Configured Grant Confirmation MAC CE);
- a MAC control element for a buffer status report (BSR), excluding a BSR included for padding (MAC CE for BSR, with exception of BSR included for padding);
- a single entry power headroom report ( ) MAC control element or a multiple entry PHR MAC control element (Single Entry PHR MAC CE or Multiple Entry PHR MAC CE);
- data from any logical channel, except data from a UL-CCCH channel (data from any Logical Channel, except data from UL-CCCH);
- a recommended bit rate query MAC control element (MAC CE for Recommended bit rate query); and
- a MAC control element for a BSR included for padding (MAC CE for BSR included for padding).

Random Access Procedure:

The random access procedure may mainly include: a contention-based random access procedure (also referred to as a contention random access procedure) and a non-contention-based random access procedure (also referred to as a contention-free random access procedure).

In the contention-based random access procedure, UE sends an Msg1 (that is, a random access request) to a network side device. After receiving the Msg1, the network side device sends an Msg2 (that is, a random access response (RAR)) to the UE, where the Msg2 carries Uplink Grant (UL Grant) information. The UE performs a MAC layer packet assembly function based on the uplink grant contained in the Msg2, to generate a MAC PDU, and stores the MAC PDU in an Msg3 buffer. Then, the UE sends the MAC PDU in the Msg3 buffer through a hybrid automatic repeat request (HARQ) process.

After receiving the Msg3, the network side device sends an Msg4 (for example, a contention resolution identity) to the UE. The UE receives the Msg4 and determines whether contention resolution is successful. If the contention resolution is successful, the random access procedure is successful; otherwise, the random access procedure is re-initiated. In the re-initiated random access procedure, when the UE receives the Uplink Grant in Msg2 again, the UE may directly retrieve the previously stored MAC PDU from the Msg3 buffer and send the MAC PDU through the HARQ process. After the random access procedure is completed, the UE flushes a HARQ buffer for Msg3 transmission of the random access procedure.

In the non-contention-based random access procedure, the UE sends an Msg1 (that is, a random access request) to the network side device. After receiving the Msg1, the network side device sends an Msg2 (that is, RAR) to the UE, where the Msg2 carries Uplink Grant information and identification information of the UE (for example, an index of a random access preamble (Preamble) of the Msg1). If the index of the random access preamble is the same as an index of a random access preamble sent with the Msg1 from the UE, the UE considers the random access procedure to be successful; otherwise, re-initiates the random access procedure.

Figure 1:
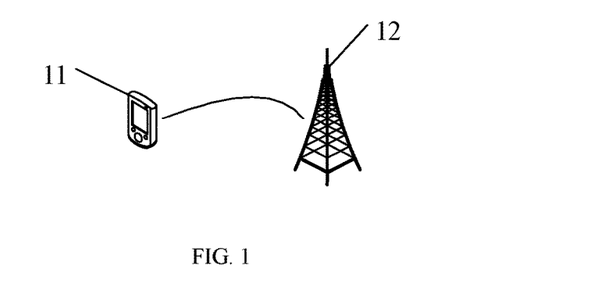
FIG. 1 is a structural diagram of a network system to which an embodiment of the present disclosure is applied.

FIG. 1 is a structural diagram of a network system to which an embodiment of the present disclosure can be applied. As shown in FIG. 1, the network system includes a terminal device 11 and a network side device 12. The terminal device 11 may be a device on a terminal device side such as a mobile phone, a tablet personal computer (Tablet Personal Computer), a laptop computer (Laptop Computer), a personal digital assistant (PDA), a mobile Internet device (MID), or a wearable device (Wearable Device). It should be noted that a specific type of the terminal device 11 is not limited in this embodiment of this disclosure. The network side device 12 may be a base station, such as a macro base station, an LTE eNB, a 5G NR NB, or a gNB. The network side device 12 may also be a small cell such as a low power node (LPN), a pico, or a femto, or the network side device 12 may be an access point (AP). The base station may also be a network node composed of a central unit (CU) and a plurality of transmission reception points (TRP) managed and controlled by the central unit. It should be noted that a specific type of the network side device 12 is not limited in this embodiment of the present disclosure.

In this embodiment of the present disclosure, the terminal device 11 may receive first uplink resource allocation information sent by the network side device 12, where the first uplink resource allocation information is used to indicate a first uplink resource, for example, an Uplink Grant.

Specifically, after receiving the first uplink resource allocation information, the terminal device 11 may perform resource allocation based on the first uplink resource allocation information. For example, the first uplink resource may be allocated to different logical channels according to the order of priorities of the different logical channels.

Optionally, in the process of performing resource allocation, the terminal device 11 may allocate the first uplink resource to data buffered by a MAC layer or data retransmitted by an upper layer as instructed by the MAC layer.

The data buffered by the MAC layer may include at least data content of a second MAC PDU buffered by the MAC layer, and the second MAC PDU may be a MAC PDU previously generated by the MAC layer. For example, the second MAC PDU may be a MAC PDU generated by the MAC layer in the previous time, such as a MAC PDU buffered in the Msg3 buffer in a random access procedure. The data content of the second MAC PDU may be data content that needs to be actually transmitted by the terminal device 11 through the second MAC PDU, for example, data content before packet assembly for the second MAC PDU. The data retransmitted by the upper layer as instructed by the MAC layer may include at least data content of a second MAC PDU buffered by the upper layer, where the upper layer may include at least one of a radio link control (RLC) layer, a packet data convergence protocol (PDCP) layer, a service data adaptation protocol (SDAP) layer, or the like.

In this embodiment of the present disclosure, the terminal device 11 may generate a new MAC PDU (that is, a first MAC PDU) based on the data buffered by the MAC layer or the data retransmitted by the upper layer as instructed by the MAC layer, and transmit the first MAC PDU to the network side device 12 over the first uplink resource, to reduce data transmission losses and improve the reliability of data transmission.

Optionally, in the case that the size of the first uplink resource is different from the size of the second MAC PDU, the terminal device 11 may send the first MAC PDU over the first uplink resource; or in the case that configuration information for resource allocation is changed, the terminal device 11 may send the first MAC PDU over the first uplink resource.

The size of the first uplink resource being different from the size of the second MAC PDU may be the size of the first uplink resource being greater than the size of the second MAC PDU, or the size of the first uplink resource being less than the size of the second MAC PDU. The configuration information for resource allocation being changed may include configuration information for LCP being changed, for example, at least one of the logical channel prioritization, a prioritized bit rate (PBR), and a logical channel number being changed.

It may be understood that in the case that the size of the first uplink resource is the same as the size of the second MAC PDU, and that the configuration information for resource allocation is not changed, the second MAC PDU can be transmitted over the first uplink resource.

In this embodiment of the present disclosure, in the case that the size of the first uplink resource is different from the size of the second MAC PDU, the first MAC PDU is sent over the first uplink resource; or in the case that the configuration information for resource allocation is changed, the first MAC PDU is sent over the first uplink resource, thereby not only reducing data transmission losses and improving the reliability of data transmission, but also saving system resources.

Optionally, in the process of performing resource allocation, the terminal device 11 may further allocate the first uplink resource to data transmitted by the upper layer to the MAC layer, where the data transmitted by the upper layer to the MAC layer may be any data buffered by the upper layer.

Optionally, in the case that the size of the first uplink resource is greater than the size of the second MAC PDU, the terminal device 11 may allocate the first uplink resource to the data transmitted by the upper layer to the MAC layer, so as to generate a new MAC PDU (that is, the first MAC PDU) based on first data and the data transmitted by the upper layer to the MAC layer, where the first data includes the data buffered by the MAC layer or the data retransmitted by the upper layer as instructed by the MAC layer.

Optionally, in the case that the size of the first uplink resource is greater than the size of the second MAC PDU, the terminal device 11 may further perform padding on the MAC PDU generated based on the first data, to make the size of the obtained first MAC PDU the same as the size of the first uplink resource.

Optionally, in the case that the size of the first uplink resource is less than the size of the second MAC PDU, a segmentation operation may be performed on data buffered by the MAC layer or data buffered by the RLC layer, and the first MAC PDU may be generated based on the segmented data.

Figure 2:
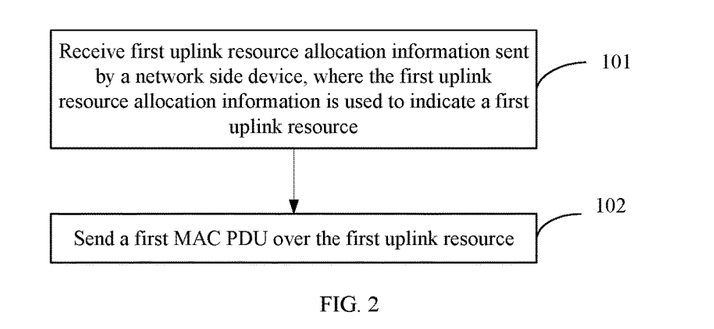
FIG. 2 is a flowchart of a data transmission method according to an embodiment of the present disclosure.

An embodiment of the present disclosure provides a data transmission method, which is applied to a terminal device. FIG. 2 is a flowchart of a data transmission method according to an embodiment of the present disclosure. As shown in FIG. 2, the method includes the following steps.

Step 201: Receive first uplink resource allocation information sent by a network side device, where the first uplink resource allocation information is used to indicate a first uplink resource.

In this embodiment of the present disclosure, the first uplink resource allocation information is used to indicate the first uplink resource. A random access procedure is taken as an example, and the first uplink resource allocation information may be an Uplink Grant.

Step 202: Send a first MAC PDU over the first uplink resource, where the first MAC PDU is a PDU obtained through packet assembly on target data based on the first uplink resource, the target data includes at least data content of a second MAC PDU, and the second MAC PDU is a MAC PDU generated in the previous time.

In practical applications, after receiving the first uplink resource allocation information, the terminal device may perform resource allocation based on the first uplink resource allocation information. For example, the first uplink resource may be allocated to different logical channels according to the order of priorities of the different logical channels. Therefore, the terminal device may generate the first MAC PDU based on data of a logical channel to which the resource is allocated. It can be understood that the data of the logical channel to which the resource is allocated may include at least data content of a second MAC PDU.

In this embodiment of the present disclosure, the second MAC PDU may be a MAC PDU generated by a MAC layer in the previous time, for example, a MAC PDU buffered in an Msg3 buffer in the random access procedure. The data content of the second MAC PDU may be data content that needs to be actually transmitted by the terminal device through the second MAC PDU, for example, data content before packet assembly for the second MAC PDU.

For example, in the case that the size of the first uplink resource is greater than the size of the second MAC PDU, the first MAC PDU may be generated based on the data content of the second MAC PDU and data transmitted by an upper layer to the MAC layer (that is, data buffered by the upper layer); or the first MAC PDU may be generated based on the data content of the second MAC PDU and padding (padding) content. In the case that the size of the first uplink resource is less than the size of the second MAC PDU, the data content of the second MAC PDU may be segmented, and the first MAC PDU is generated based on the segmented data.

It can be understood that in the case that the size of the first uplink resource is the same as the size of the second MAC PDU, the first MAC PDU can be sent over the first uplink resource, and the second MAC PDU can also be sent over the first uplink resource. This is not limited in this embodiment of the present disclosure.

The following describes this embodiment of the present disclosure by using a random access procedure as an example:

When UE (also referred to as a terminal device) performs a random access procedure, if a previous random access procedure is contention-based, the UE generates a MAC PDU and buffers it in an Msg3 buffer. When a random access procedure re-initiated by the UE is non-contention-based, after the UE receives an uplink grant in an Msg2, the terminal device may generate a new MAC PDU (that is, a first MAC PDU) based on the currently received uplink grant and data content of a previously buffered MAC PDU (that is, a second MAC PDU) in the Msg3 buffer, and may transmit the first MAC PDU by using the uplink grant in the Msg2, so as to reduce data transmission losses caused by a change of the size of an uplink resource in the random access procedure, and improve the reliability of data transmission.

According to the data transmission method provided in this embodiment of the present disclosure, first uplink resource allocation information sent by a network side device is received, where the first uplink resource allocation information is used to indicate a first uplink resource; and a first MAC PDU is sent over the first uplink resource, where the first MAC PDU is a PDU obtained through packet assembly on target data based on the first uplink resource, the target data includes at least data content of a second MAC PDU, and the second MAC PDU is a MAC PDU generated in the previous time. In the case that the size of an uplink resource is changed, a PDU obtained through packet assembly based on data content of the MAC PDU generated in the previous time can be transmitted, thereby reducing data transmission losses caused by the change of the size of the uplink resource, and improving the reliability of data transmission.

Optionally, step 202, described above, of sending a first MAC PDU over the first uplink resource includes:

in the case that the size of the first uplink resource is different from the size of the second MAC PDU, sending the first MAC PDU over the first uplink resource; or in the case that configuration information for resource allocation is changed, sending the first MAC PDU over the first uplink resource.

In this embodiment of the present disclosure, the size of the first uplink resource being different from the size of the second MAC PDU may be the size of the first uplink resource being greater than the size of the second MAC PDU, or the size of the first uplink resource being less than the size of the second MAC PDU. The configuration information for resource allocation being changed may include configuration information for LCP being changed, for example, at least one of logical channel prioritization, a PBR, and a logical channel number being changed.

Specifically, in the case that the size of the first uplink resource is different from the size of the second MAC PDU, or that the configuration information for resource allocation is changed, a new MAC PDU (that is, the first MAC PDU) may be generated based on the data content of the second MAC PDU, and the first MAC PDU can be sent over the first uplink resource. In the case that the size of the first uplink resource is the same as the size of the second MAC PDU, and that the configuration information for resource allocation is not changed, the second MAC PDU can be transmitted over the first uplink resource.

In this embodiment of the present disclosure, in the case that the size of the first uplink resource is different from the size of the second MAC PDU, the first MAC PDU is sent over the first uplink resource; or in the case that the configuration information for resource allocation is changed, the first MAC PDU is sent over the first uplink resource, thereby not only reducing data transmission losses and improving the reliability of data transmission, but also saving system resources.

Optionally, the target data includes at least first data, and the first data includes data buffered by a MAC layer or data retransmitted by an upper layer as instructed by the MAC layer.

In this embodiment of the present disclosure, the data buffered by the MAC layer may include at least data content of a second MAC PDU buffered by the MAC layer. The data retransmitted by the upper layer as instructed by the MAC layer may include at least data content of a second MAC PDU buffered by the upper layer, where the upper layer may include at least one of an RLC layer, a PDCP layer, and a SDAP layer.

In an implementation, the MAC layer may retain the data content of the second MAC PDU buffered by the MAC layer, so that the terminal device can generate a new MAC PDU (that is, the first MAC PDU) based on the data buffered by the MAC layer, and transmit the first MAC PDU to the network side device over the first uplink resource.

In another implementation, the MAC layer may flush the data content of the second MAC PDU buffered by the MAC layer, and may instruct the upper layer to perform data retransmission. For example, the MAC layer performs an LCP process, allocates the first uplink resource to data buffered by an RLC layer of a logical channel 1, and instructs the RLC layer to perform data retransmission. The MAC layer receives data retransmitted by the upper layer, generates the first MAC PDU based on the data retransmitted by the upper layer to the MAC layer, and transmits the first MAC PDU to the network side device over the first uplink resource.

In this embodiment of the present disclosure, a new MAC PDU (that is, a first MAC PDU) is generated based on the data buffered by the MAC layer or the data retransmitted by the upper layer as instructed by the MAC layer, and the first MAC PDU is transmitted to the network side device over the first uplink resource, to reduce data transmission losses and improve the reliability of data transmission.

Optionally, the target data may further include data transmitted by the upper layer to the MAC layer.

In this embodiment of the present disclosure, the data transmitted by the upper layer to the MAC layer may be any data buffered by the upper layer. In practical applications, in the process of performing resource allocation, the first uplink resource may be allocated to both the first data and the data transmitted by the upper layer to the MAC layer.

For example, the MAC layer allocates an uplink resource of 100 bytes (byte) to the logical channel 1, where 50 bytes is allocated to the data buffered by the MAC layer, and it is indicated that data of 50 bytes may be sent by an RLC entity corresponding to the logical channel 1, that is, the data transmitted by the upper layer to the MAC layer.

It should be noted that the first data and the data transmitted by the upper layer to the MAC layer may come from a same logical channel or different logical channels, which is not limited in this embodiment of the present disclosure.

Optionally, in the case that the size of the first uplink resource is greater than the size of the second MAC PDU, the target data may further include the data transmitted by the upper layer to the MAC layer.

In this embodiment of the present disclosure, in the case that the size of the first uplink resource is greater than the size of the second MAC PDU, the target data may further include the data transmitted by the upper layer to the MAC layer, thereby ensuring that other data can be transmitted while the data content of the second MAC PDU is transmitted.

Optionally, the first data and the data transmitted by the upper layer to the MAC layer come from a same logical channel.

In this embodiment of the present disclosure, in the process of performing resource allocation, the first uplink resource may be allocated to the first data and the data transmitted by the upper layer to the MAC layer (that is, the data buffered by the upper layer) that are in the same logical channel.

For example, when performing the LCP process, the MAC layer may allocate the first uplink resource to both the data buffered by the MAC layer and the data buffered by the upper layer (for example, at least one of the RLC layer, the PDCP layer, and the SDAP layer) that are in the logical channel 1.

Optionally, a sending priority of the first data is higher than a sending priority of the data transmitted by the upper layer to the MAC layer.

In this embodiment of the present disclosure, the sending priority of the first data is higher than the sending priority of the data transmitted by the upper layer to the MAC layer, so that the sending of the first data can be ensured.

Specifically, in the process of performing resource allocation, the terminal device may preferentially allocate a resource to the first data, and allocate the remaining resource to the data transmitted by the upper layer to the MAC layer, thereby ensuring that the sending priority of the first data is higher than the sending priority of the data transmitted by the upper layer to the MAC layer.

Optionally, when the MAC layer allocates the remaining resource to the data buffered by the upper layer, the allocation of the remaining resource may be indicated to the upper layer. For example, the MAC layer allocates an uplink resource of 100 bytes to the logical channel 1, where 50 bytes is preferentially allocated to the data buffered by the MAC layer, the remaining 50 bytes is allocated to the data transmitted by the upper layer to the MAC layer, and it is indicated that data of 50 bytes may be sent by an RLC entity corresponding to the logical channel 1.

Optionally, before the sending a first MAC PDU over the first uplink resource, the method further includes:
generating a same MAC SDU by combining the first data and data transmitted by the upper layer to the MAC layer that are in a same logical channel; or
generating different MAC SDUs from the first data and data transmitted by the upper layer to the MAC layer that are in a same logical channel.

In this embodiment of the present disclosure, for a logical channel to which the resource is allocated, a same MAC service data unit (SDU) may be generated by combining the first data and the data transmitted by the upper layer to the MAC layer that are in the same logical channel, or different MAC SDUs may be generated from the first data and the data transmitted by the upper layer to the MAC layer that are in the same logical channel.

Figure 3:
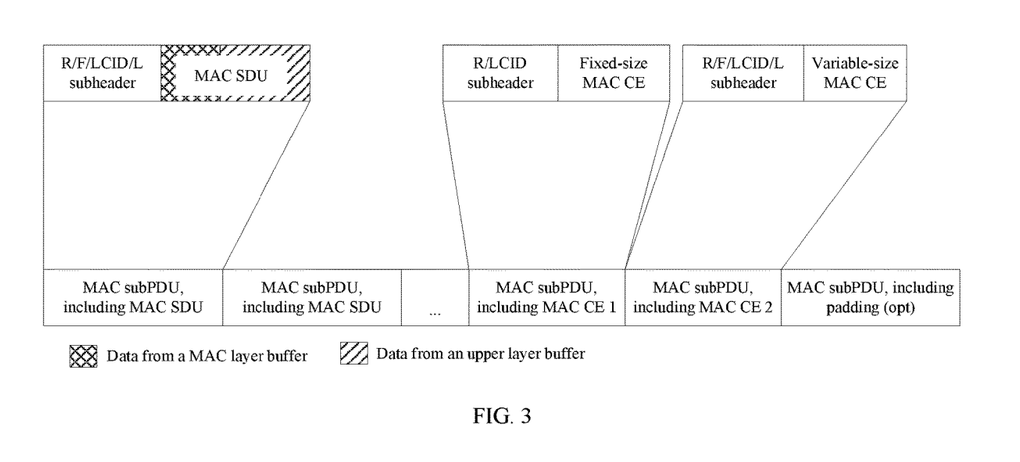
FIG. 3 is a schematic diagram of a manner of constructing a MAC PDU according to an embodiment of the present disclosure.
Figure 4:
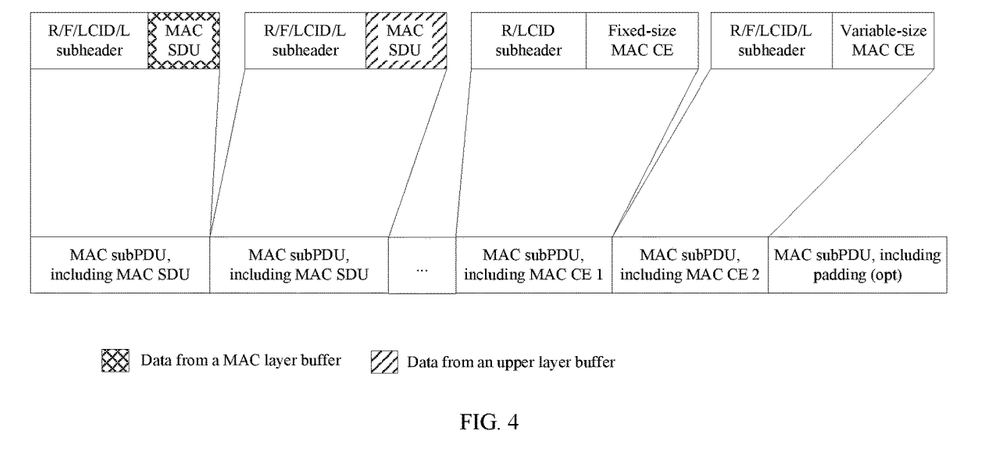
FIG. 4 is a schematic diagram of another manner of constructing a MAC PDU according to an embodiment of the present disclosure.

For example, as shown in FIG. 3, a same MAC SDU may be generated by combining data from a MAC buffer (that is, data buffered by the MAC layer) and data from an upper layer buffer (that is, data transmitted by the upper layer to the MAC layer) that are in a same logical channel. Alternatively, as shown in FIG. 4, different MAC SDUs may be generated from data from a MAC buffer (that is, data buffered by the MAC layer) and data from an upper layer buffer (that is, data transmitted by the upper layer to the MAC layer) that are in a same logical channel.

In this embodiment of the present disclosure, generating the same MAC SDU by combining the first data and the data transmitted by the upper layer to the MAC layer that are in the same logical channel facilitates parsing data according to the logical channel, and generating the different MAC SDUs from the first data and the data transmitted by the upper layer to the MAC layer that are in the same logical channel facilitates parsing different data according to the MAC SDUs.

Optionally, before the sending a first MAC PDU over the first uplink resource, the method further includes:
in the case that the size of a resource allocated to the first data is greater than the size of the first data, padding a MAC PDU generated based on the first data, to obtain the first MAC PDU.

Figure 5:
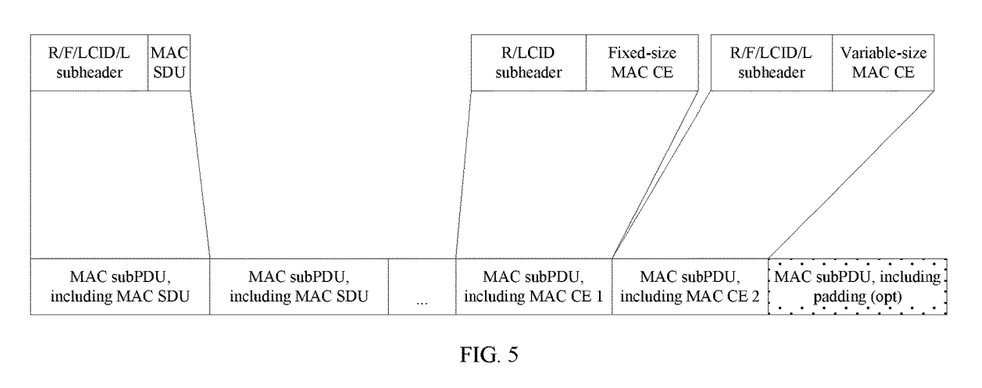
FIG. 5 is a schematic diagram of another manner of constructing a MAC PDU according to an embodiment of the present disclosure.

In this embodiment of the present disclosure, in the case that the size of the resource allocated to the first data is greater than the size of the first data, to make the size of the generated MAC PDU matches the size of the resource allocated to the first data, the MAC PDU generated based on the first data may be padded. For example, as shown in FIG. 5, additional padding bits (namely, padding) are added at the end of the MAC PDU.

In this embodiment of the present disclosure, the MAC PDU generated based on the first data is padded, so that the size of the padded first MAC PDU matches the size of the resource allocated to the first data, and the implementation is relatively simple and convenient.

Optionally, before the sending a first MAC PDU over the first uplink resource, the method further includes:
allocating the first uplink resource to a first logical channel;
in the case that the size of a resource allocated to the first logical channel is less than the size of second data buffered by a MAC layer, perform a segmentation operation on the second data buffered by the MAC layer or the second data buffered by a radio link control RLC layer, where the second data is data from the first logical channel; and generating the first MAC PDU based on the segmented data.

In this embodiment of the present disclosure, the first logical channel may be any logical channel. In practical applications, in the case that the size of the resource allocated to the first logical channel is less than the size of the data buffered by the MAC layer from the logical channel (that is, the second data), the second data may be segmented.

Figure 6:
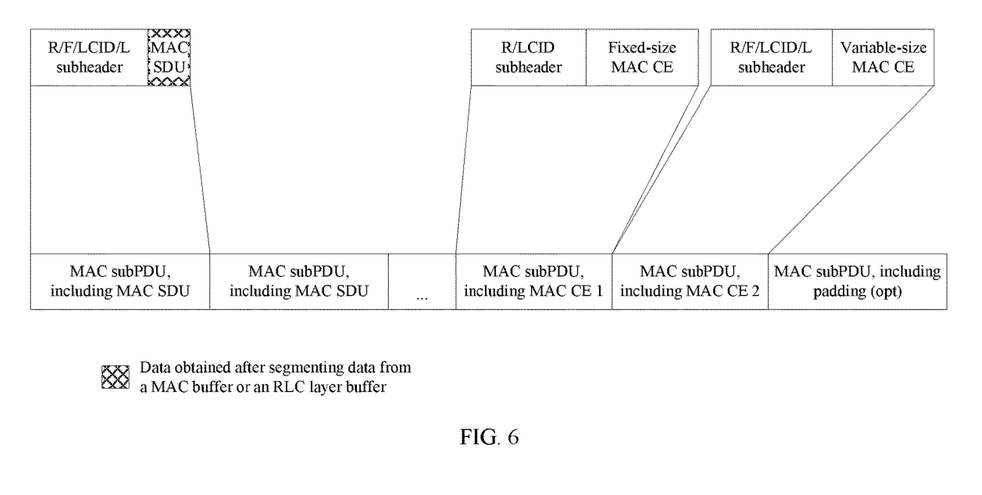
FIG. 6 is a schematic diagram of another manner of constructing a MAC PDU according to an embodiment of the present disclosure.

For example, in the case that the size of the resource allocated to the first logical channel is less than the size of the second data, the MAC layer may instruct the RLC layer to perform a segmentation operation and send the segmented data to the MAC layer, so that the MAC layer can generate the first MAC PDU based on the segmented data, as shown in FIG. 6. It should be noted that the RLC layer may perform segmentation based on the second data buffered by the RLC layer, or may perform segmentation based on the first data buffered by the MAC layer.

In this embodiment of the present disclosure, in the case that the size of the resource allocated to the first logical channel is less than the size of the second data buffered by the MAC layer, the segmentation operation is performed on the second data buffered by the MAC layer or the second data buffered by the RLC layer, and the first MAC PDU is generated based on the segmented data, so that the second data can be transmitted.

It should be noted that in a random access procedure, the first MAC PDU may be stored in a buffer (for example, an Msg3 buffer) for use in data retransmission in a subsequent random access procedure.

Optionally, before the sending a first MAC PDU over the first uplink resource, the method further includes:
  allocating the first uplink resource to a second logical channel; and
  updating a variable value of the second logical channel based on a data volume of third data buffered by a MAC layer, where the third data is data from the second logical channel.

In this embodiment of the present disclosure, when the MAC layer allocates a resource (for example, during the LCP process) to a logical channel, the MAC layer may update the variable value (namely, Bj) of the logical channel based on the data volume of the logical channel that is buffered in the MAC layer. For example, the data volume of the logical channel that is buffered in the MAC layer may be added to the variable value of the logical channel, so that the variable value of the logical channel is greater than 0, and the sending of data of the logical channel can be ensured.

For example, before the LCP allocates a resource to the logical channel 1, Bj of the logical channel 1=100 bytes; the LCP allocates 50 bytes to the logical channel 1, and then Bj of the logical channel 1=100−50=50 bytes. During reconstruction of the MAC PDU, the data of the logical channel 1 that is buffered by the MAC is 50 bytes. When the LCP re-allocates a resource to the logical channel 1, Bj of the logical channel 1=50+50=100 bytes (that is, the buffered 50 bytes is added), so that the LCP can allocate a resource to the logical channel based on the recalculated Bj value.

In this embodiment of the present disclosure, the variable value of the second logical channel is updated based on the data volume of the third data buffered by the MAC layer, for example, the data volume of the logical channel that is buffered in the MAC layer is added to the variable value of the logical channel, so that the variable value of the logical channel is greater than 0, and the sending of data of the second logical channel can be ensured.

The following describes the data transmission method in this embodiment of the present disclosure by using examples:

Implementation 1:

Step a1: The MAC layer receives resource allocation information for data transmission (that is, the first resource allocation information described above), for example, an Uplink Grant.

Step b1: The MAC layer performs a packet assembly operation or a packet reassembly operation.

A trigger condition for the packet assembly operation or the packet reassembly operation may include any one of the following:
  the size of a resource indicated by the resource allocation information is changed, for example, the size of the uplink grant (Uplink Grant) is different from (for example, greater or less than) the size of a MAC PDU stored in an Msg3 buffer, that is, the MAC PDU stored in the Msg3 buffer cannot be sent with the uplink grant (Uplink Grant); or
  the operation is performed each time the resource allocation information is received.

The foregoing packet assembly operation or packet reassembly operation may include:
  in the process of resource allocation, the resource indicated by the resource allocation information (that is, the first uplink resource described above) is allocated to both data buffered by the MAC layer and data buffered by the upper layer (that is, data transmitted by the upper layer to the MAC layer).

Optionally, in the process of resource allocation, the resource indicated by the resource allocation information may also be allocated to both data buffered by the MAC layer and data buffered by the upper layer that are in a same logical channel.

For example, when performing the LCP process, the MAC layer allocates the Uplink Grant to both the data buffered by the MAC layer and the data buffered by the upper layer (for example, at least one of the RLC layer, the PDCP layer, and the SDAP layer) that are in the logical channel 1.

Optionally, in the process of resource allocation, after allocating the resource to the data buffered by the MAC layer, the MAC layer allocates the remaining resource to the data buffered by the upper layer, and the allocation of the remaining resource may be indicated to the upper layer.

For example, the MAC layer allocates an uplink resource of 100 bytes to the logical channel 1, where 50 bytes is allocated to the data buffered by the MAC layer, and then it is indicated that data of 50 bytes is sent by an RLC entity corresponding to the logical channel 1.

Step c1: For the logical channel to which the resource is allocated, construct a MAC PDU in at least one of the following manners:

Manner 1: A same MAC PDU is generated by combining the data buffered by the MAC layer and the data buffered by the upper layer that are in the same logical channel, as shown in FIG. 3.

Manner 2: Different MAC PDUs are generated from the data buffered by the MAC layer and the data buffered by the upper layer that are in the same logical channel, as shown in FIG. 4.

Manner 3: If the size of a resource allocated by the MAC layer to a logical channel is less than the size of data of the logical channel that is buffered by the MAC layer, the MAC layer instructs the RLC layer to perform a segmentation operation and then sends segmented data packets to the MAC layer, as shown in FIG. 6.

Manner 4: If the size of the resource allocated by the MAC layer is greater than the size of the data buffered by the MAC layer, the MAC layer adds additional padding bits (namely, padding) at the end of the MAC PDU, as shown in FIG. 5.

Optionally, in a contention-free random access procedure, the generated MAC PDU is stored in a buffer (for example, an Msg3 buffer) for use in data retransmission in a subsequent random access procedure.

Optionally, when the MAC layer allocates a resource (for example, during the LCP process) to a logical channel, for the data of the logical channel previously buffered in the MAC layer, the MAC layer adds the data volume of the logical channel buffered in the MAC layer to a pre-allocated share (Bj) of the logical channel.

In this embodiment of the present disclosure, during the construction of the MAC PDU, the terminal device considers the data volume of the logical channel that is buffered in the MAC layer and the data volume buffered by the upper layer (such as RLC, PDCP, or SDAP) for resource allocation, and after a resource is allocated to each logical channel, the data buffered by the MAC layer and the data buffered by the upper layer are combined in a same MAC PDU for transmission.

Implementation 2:

Step a2: The MAC layer receives resource allocation information for data transmission (that is, the first resource allocation information described above), for example, an Uplink Grant.

Step b2: The MAC layer performs a packet assembly operation or a packet reassembly operation.

A trigger condition for the packet assembly operation or the packet reassembly operation may include any one of the following:

the size of a resource indicated by the resource allocation information is changed, for example, the size of the Uplink Grant is different from (for example, greater or less than) the size of a MAC PDU stored in an Msg3 buffer, that is, the MAC PDU stored in the Msg3 buffer cannot be sent with the Uplink Grant; or the operation is performed each time the resource allocation information is received.

The foregoing packet assembly operation or packet reassembly operation may include:

discarding data previously buffered in the MAC layer and generating a new MAC PDU.

Optionally, the discarding data previously buffered in the MAC layer and generating a new MAC PDU includes instructing the upper layer to perform data retransmission.

For example, when performing the LCP process, the MAC layer allocates the Uplink Grant to the data of the logical channel 1 that is buffered by the upper layer (for example, at least one of the RLC layer, the PDCP layer, and the SDAP layer), and the MAC layer instructs the RLC layer to perform data retransmission.

Step c2: The RLC layer sends, based on the indication information of the MAC layer, the retransmission data to the MAC layer for data transmission.

Optionally, in the case that the size of the resource allocated in step b2 is less than the size of a retransmitted data packet, the RLC layer performs a segmentation (or re-segmentation) operation on the data packet to be retransmitted.

Optionally, when the MAC layer allocates a resource (for example, during the LCP process) to a logical channel, for the data of the logical channel previously buffered in the MAC layer, the MAC layer may add the data volume of the logical channel buffered in the MAC layer to a pre-allocated share (Bj) of the logical channel.

In this implementation, during the construction of the MAC PDU, the terminal device considers only the data volume buffered by the upper layer (for example, at least one of RLC, PDCP, and SDAP) for resource allocation. After a resource is allocated to each logical channel, the MAC layer indicates to an RLC entity of a specific logical channel that data retransmission needs to be performed. The RLC entity sends RLC data to be retransmitted to the MAC layer based on the indication information of the MAC layer for MAC PDU packet assembly.

According to the data transmission method provided in this embodiment of the present disclosure, when the uplink grant changes, the MAC PDU can be reconstructed to prevent a data packet loss, thereby improving the reliability of data transmission.

Figure 7:
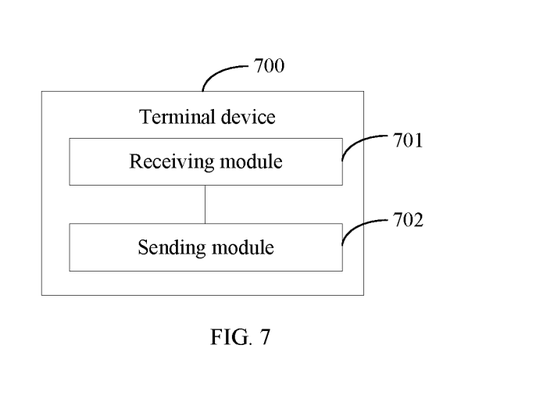
FIG. 7 is a structural diagram of a terminal device according to an embodiment of the present disclosure.

FIG. 7 is a structural diagram of a terminal device according to an embodiment of the present disclosure. As shown in FIG. 7, the terminal device 700 includes a receiving module 701 and a sending module 702.

The receiving module 701 is configured to receive first uplink resource allocation information sent by a network side device, where the first uplink resource allocation information is used to indicate a first uplink resource.

The sending module 702 is configured to send a first MAC PDU over the first uplink resource.

The first MAC PDU is a PDU obtained through packet assembly on target data based on the first uplink resource, the target data includes at least data content of a second MAC PDU, and the second MAC PDU is a MAC PDU previously generated by a MAC layer. For example, the second MAC PDU is a MAC PDU generated in the previous time.

Optionally, the sending module is specifically configured to:

in the case that the size of the first uplink resource is different from the size of the second MAC PDU, send the first MAC PDU over the first uplink resource; or in the case that configuration information for resource allocation is changed, send the first MAC PDU over the first uplink resource.

Optionally, the target data includes at least first data, and the first data includes data buffered by a MAC layer or data retransmitted by an upper layer as instructed by the MAC layer.

Optionally, the target data further includes data transmitted by the upper layer to the MAC layer.

Optionally, in the case that the size of the first uplink resource is greater than the size of the second MAC PDU, the target data further includes the data transmitted by the upper layer to the MAC layer.

Optionally, the first data and the data transmitted by the upper layer to the MAC layer come from a same logical channel.

Optionally, a sending priority of the first data is higher than a sending priority of the data transmitted by the upper layer to the MAC layer.

Optionally, the terminal device further includes a first generation module, where the first generation module is specifically configured to:

before the first MAC PDU is sent over the first uplink resource, generate a same MAC SDU by combining the first data and data transmitted by the upper layer to the MAC layer that are in a same logical channel; or before the first MAC PDU is sent over the first uplink resource, generate different MAC SDUs from the first data and data transmitted by the upper layer to the MAC layer that are in a same logical channel.

Optionally, the terminal device further includes:

a padding module, configured to: before the first MAC PDU is sent over the first uplink resource, in the case that the size of a resource allocated to the first data is greater than the size of the first data, pad a MAC PDU generated based on the first data, to obtain the first MAC PDU.

Optionally, the terminal device further includes:

a first allocation module, configured to: before the first MAC PDU is sent over the first uplink resource, allocate the first uplink resource to a first logical channel;

a segmentation module, configured to: in the case that the size of a resource allocated to the first logical channel is less than the size of second data buffered by a MAC layer, perform a segmentation operation on the second data buffered by the MAC layer or the second data buffered by a radio link control RLC layer, where the second data is data from the first logical channel; and a second generation module, configured to generate the first MAC PDU based on the segmented data.

Optionally, the terminal device further includes:

a second allocation module, configured to: before the first MAC PDU is sent over the first uplink resource, allocate the first uplink resource to a second logical channel; and an update module, configured to update a variable value of the second logical channel based on a data volume of third data buffered by a MAC layer, where the third data is data from the second logical channel.

The terminal device 700 provided in this embodiment of the present disclosure can implement the processes that are implemented by the terminal device in the method embodiment of FIG. 2. To avoid repetition, details are not described herein again.

According to the terminal device 700 in this embodiment of the present disclosure, the receiving module 701 is configured to receive first uplink resource allocation information sent by a network side device, where the first uplink resource allocation information is used to indicate a first uplink resource; and the sending module 702 is configured to send a first MAC PDU over the first uplink resource, where the first MAC PDU is a PDU obtained through packet assembly on target data based on the first uplink resource, the target data includes at least data content of a second MAC PDU, and the second MAC PDU is a MAC PDU generated in the previous time. In the case that the size of an uplink resource is changed, a PDU obtained through packet assembly based on data content of the MAC PDU generated in the previous time can be transmitted, thereby reducing data transmission losses caused by the change of the size of the uplink resource, and improving the reliability of data transmission.

Figure 8:
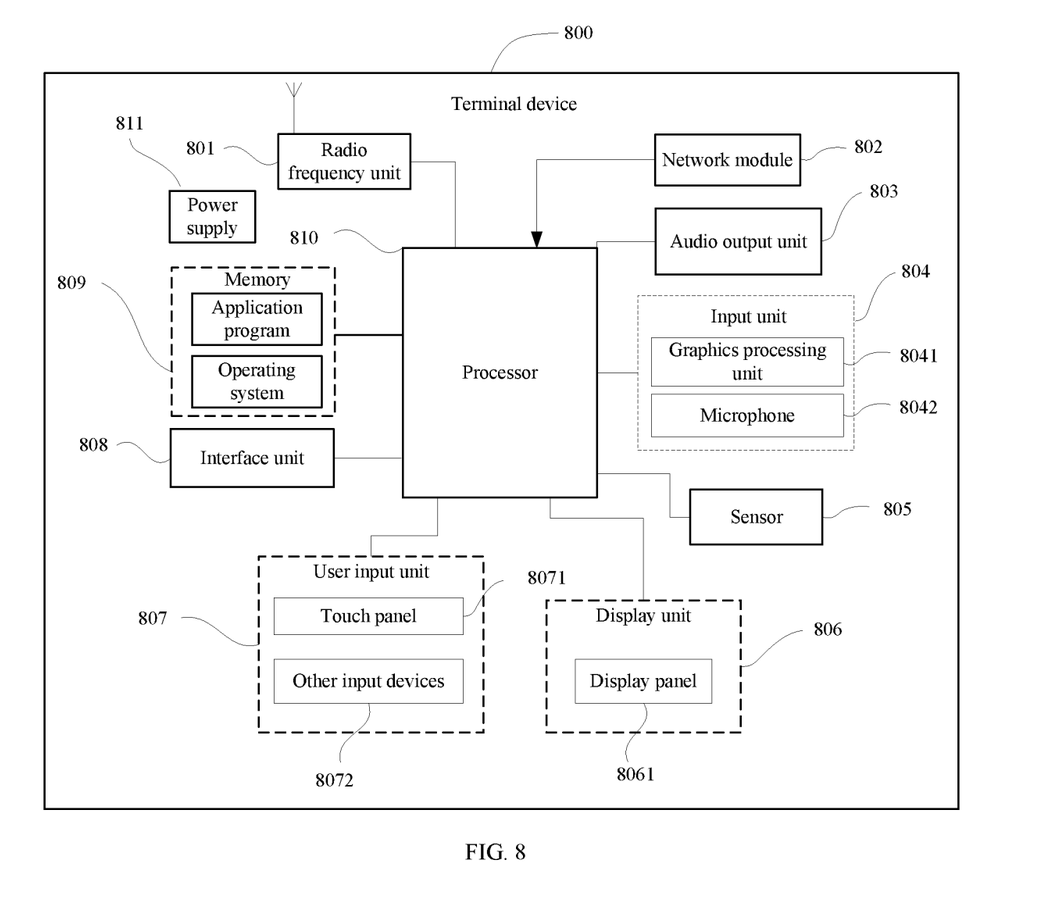
FIG. 8 is another structural diagram of a terminal device according to an embodiment of the present disclosure.

FIG. 8 is another structural diagram of a terminal device according to an embodiment of the present disclosure. Referring to FIG. 8, the terminal device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal device shown in FIG. 8 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The radio frequency unit 801 is configured to: receive first uplink resource allocation information sent by a network side device, where the first uplink resource allocation information is used to indicate a first uplink resource; and send a first MAC PDU over the first uplink resource, where the first MAC PDU is a PDU obtained through packet assembly on target data based on the first uplink resource, the target data includes at least data content of a second MAC PDU, and the second MAC PDU is a MAC PDU generated in the previous time.

In this embodiment of the present disclosure, the PDU obtained through packet assembly on the target data based on the first uplink resource is sent over the first uplink resource. Because the target data includes at least the data content of the second MAC PDU, in the case that the size of an uplink resource is changed, a PDU obtained through packet assembly based on data content of the MAC PDU generated in the previous time can be transmitted, thereby reducing data transmission losses caused by the change of the size of the uplink resource, and improving the reliability of data transmission.

Optionally, the radio frequency unit 801 is further configured to:
in the case that the size of the first uplink resource is different from the size of the second MAC PDU, send the first MAC PDU over the first uplink resource; or
in the case that configuration information for resource allocation is changed, send the first MAC PDU over the first uplink resource.

Optionally, the target data includes at least first data, and the first data includes data buffered by a MAC layer or data retransmitted by an upper layer as instructed by the MAC layer.

Optionally, the target data further includes data transmitted by the upper layer to the MAC layer.

Optionally, in the case that the size of the first uplink resource is greater than the size of the second MAC PDU, the target data further includes the data transmitted by the upper layer to the MAC layer.

Optionally, the first data and the data transmitted by the upper layer to the MAC layer come from a same logical channel.

Optionally, a sending priority of the first data is higher than a sending priority of the data transmitted by the upper layer to the MAC layer.

Optionally, the processor 810 is configured to:
before the first MAC PDU is sent over the first uplink resource, generate a same MAC SDU by combining the first data and data transmitted by the upper layer to the MAC layer that are in a same logical channel; or
before the first MAC PDU is sent over the first uplink resource, generate different MAC SDUs from the first data and data transmitted by the upper layer to the MAC layer that are in a same logical channel.

Optionally, the processor 810 is configured to:
before the first MAC PDU is sent over the first uplink resource, in the case that the size of a resource allocated to the first data is greater than the size of the first data, pad a MAC PDU generated based on the first data, to obtain the first MAC PDU.

Optionally, the processor 810 is configured to:
before the first MAC PDU is sent over the first uplink resource, allocate the first uplink resource to a first logical channel;
in the case that the size of a resource allocated to the first logical channel is less than the size of second data buffered by a MAC layer, perform a segmentation operation on the second data buffered by the MAC layer or the second data buffered by a radio link control RLC layer, where the second data is data from the first logical channel; and
generate the first MAC PDU based on the segmented data.

Optionally, the processor 810 is configured to:

before the first MAC PDU is sent over the first uplink resource, allocate the first uplink resource to a second logical channel; and update a variable value of the second logical channel based on a data volume of third data buffered by a MAC layer, where the third data is data from the second logical channel.

It should be understood that in this embodiment of the present disclosure, the radio frequency unit 801 may be configured to receive and send signals in a process of receiving and sending information or calling. Specifically, the radio frequency unit 801 receives downlink data from a base station for processing by the processor 810, and sends uplink data to the base station. Generally, the radio frequency unit 801 includes but is not limited to an antenna, at least one amplifier, a transceiver, a coupler, a low noise amplifier, and a duplexer. In addition, the radio frequency unit 801 may further communicate with a network and other devices through a wireless communications system.

The terminal device provides a user with wireless broadband Internet access through the network module 802, for example, helps the user send and receive emails, browse web pages, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, call signal receiving sound or message receiving sound) related to a specific function performed by the terminal device 800. The audio output unit 803 includes a loudspeaker, a buzzer, a telephone receiver, and the like.

The input unit 804 is configured to receive an audio or video signal. The input unit 804 may include a graphics processing unit (GPU) 8041 and a microphone 8042. The graphics processing unit 8041 processes image data of a still picture or video acquired by an image capturing apparatus (for example, a camera) in a video capturing mode or an image capturing mode. A processed image frame can be displayed on the display unit 806. The image frame processed by the graphics processing unit 8041 can be stored in the memory 809 (or another storage medium) or sent via the radio frequency unit 801 or the network module 802. The microphone 8042 may receive sound and can process such sound into audio data. The processed audio data may be converted in a telephone call mode into a format that can be sent by the radio frequency unit 801 to a mobile communications base station for output.

The terminal device 800 further includes at least one sensor 805, for example, an optical sensor, a motion sensor, and other sensors. Specifically, the optical sensor includes an ambient light sensor and a proximity sensor. The ambient light sensor may adjust luminance of the display panel 8061 based on brightness of ambient light. The proximity sensor may turn off the display panel 8061 and/or backlight when the terminal device 800 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, and an infrared sensor. Details are not described herein.

The display unit 806 is configured to display information input by a user or information provided to a user. The display unit 806 may include a display panel 8061. The display panel 8061 may be configured in a form of liquid crystal display (LCD), organic light-emitting diode (OLED), and the like.

The user input unit 807 may be configured to receive entered digit or character information and generate a key signal input related to user setting and function control of the terminal device. Specifically, the user input unit 807 includes a touch panel 8071 and other input devices 8072. The touch panel 8071, also referred to as a touchscreen, may capture a touch operation performed by a user on or near the touch panel (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 810, and receives and executes a command from the processor 810. In addition, the touch panel 8071 may be implemented by using a plurality of types such as a resistive type, a capacitive type, an infrared ray, and a surface acoustic wave. The user input unit 807 may further include other input devices 8072 in addition to the touch panel 8071. Specifically, the other input devices 8072 may include but are not limited to a physical keyboard, a function key (such as a volume control key or a power on/off key), a trackball, a mouse, a joystick, and the like. Details are not described herein.

Further, the touch panel 8071 can cover the display panel 8061. When detecting a touch operation on or near the touch panel 8071, the touch panel 8071 transmits the touch operation to the processor 810 to determine a type of a touch event. Then the processor 810 provides a corresponding visual output on the display panel 8061 based on the type of the touch event. Although in FIG. 8, the touch panel 8071 and the display panel 8061 are configured as two independent components to implement input and output functions of the terminal device, in some embodiments, the touch panel 8071 and the display panel 8061 can be integrated to implement the input and output functions of the terminal device. Details are not limited herein.

The interface unit 808 is an interface for connecting an external apparatus to the terminal device 800. For example, the external apparatus can include a wired or wireless headphone port, an external power supply (or a battery recharger) port, a wired or wireless data port, a memory card port, a port for connection with an apparatus having an identification module, an audio input/output (I/O) port, a video I/O port, an earphone port, and the like. The interface unit 808 may be configured to receive input (for example, data information and power) from the external apparatus and transmit the received input to one or more elements in the terminal device 800, or may be configured to transmit data between the terminal device 800 and the external apparatus.

The memory 809 may be configured to store a software program and various data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, and may further include a non-volatile memory such as at least one magnetic disk storage component, a flash memory component, or another volatile solid-state storage component.

The processor 810 is a control center of the terminal device. The processor 810 uses various interfaces and lines to connect all parts of the entire terminal device, and performs various functions and data processing of the terminal device by running or executing the software program and/or module stored in the memory 809 and invoking data stored in the memory 809, thereby performing overall monitoring on the terminal device. The processor 810 can include one or more processing units. Preferably, the processor 810 can be integrated with an application processor and a modem processor. The application processor mainly processes the operating system, the user interface, applications, etc. The modem processor mainly processes wireless communication. It can be understood that alternatively, the modem processor may not be integrated into the processor 810.

The terminal device 800 may further include the power supply 811 (such as a battery) supplying power to each component. Preferably, the power supply 811 may be logically connected to the processor 810 by using a power management system, so as to implement functions such as charging management, discharging management and power consumption management by using the power management system.

In addition, the terminal device 800 includes some functional modules that are not shown. Details are not described herein.

Optionally, an embodiment of the present disclosure further provides a terminal device, including a processor 810, a memory 809, and a computer program stored in the memory 809 and capable of running on the processor 810. When the computer program is executed by the processor 810, the processes of the foregoing embodiments of the data transmission method are implemented, with the same technical effects achieved. To avoid repetition, details are not described herein again.

An embodiment of the present disclosure further provides a computer-readable storage medium, where the computer-readable storage medium stores a computer program. When the computer program is executed by a processor, the processes of the foregoing embodiments of the data transmission method are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the essence of the present disclosure and the protection scope of the claims, all of which fall within the protection of the present disclosure.

What is claimed is:

1. A data transmission method, applied to a terminal device, comprising:

receiving first uplink resource allocation information sent by a network side device, wherein the first uplink resource allocation information is used to indicate a first uplink resource; and sending a first Medium Access Control Protocol Data Unit (MAC PDU) over the first uplink resource when a size of the first uplink resource is greater than a size of a second MAC PDU previously generated and buffered in a MAC layer buffer or configuration information for resource allocation changes, wherein the first MAC PDU is generated through packet assembly based on target data, wherein the target data comprises data content of the previously generated second MAC PDU obtained from the MAC layer buffer and data transmitted from an upper layer to a MAC layer, wherein the data content of the previously generated second MAC PDU and the data transmitted from the upper layer to the MAC layer come from a same logical channel, wherein the upper layer comprises a Radio Link Control (RLC) layer, a Packet Data Convergence Protocol (PDCP) layer, or a Service Data Adaptation Protocol (SDAP) layer, wherein before sending the first MAC PDU over the first uplink resource, the method further comprises:

generating a same MAC Service Data Unit (SDU) by combining the data content of the previously generated second MAC PDU obtained from the MAC layer buffer and the data transmitted from the upper layer to the MAC layer that are in the same logical channel; or generating different MAC SDUs from the data content of the previously generated second MAC PDU obtained from the MAC layer buffer and the data transmitted from the upper layer to the MAC layer that are in the same logical channel.

2. The data transmission method according to claim 1, wherein a sending priority of the data content of the previously generated second MAC PDU obtained from the MAC layer buffer is higher than a sending priority of the data transmitted from the upper layer to the MAC layer.

3. The data transmission method according to claim 1, wherein before the sending a first MAC PDU over the first uplink resource, the method further comprises:
when the size of a resource allocated to the target data is greater than the size of the target data, padding a MAC PDU generated based on the target data, to obtain the first MAC PDU.

4. The data transmission method according to claim 1, wherein before the sending a first MAC PDU over the first uplink resource, the method further comprises:
allocating the first uplink resource to a first logical channel;
in the case that the size of a resource allocated to the first logical channel is less than the size of second data buffered by a MAC layer, performing a segmentation operation on the second data buffered by the MAC layer or the second data buffered by the RLC layer, wherein the second data is data from the first logical channel; and
generating the first MAC PDU based on the segmented data.

5. The data transmission method according to claim 1, wherein before the sending a first MAC PDU over the first uplink resource, the method further comprises:
allocating the first uplink resource to a second logical channel; and
updating a variable value of the second logical channel based on a data volume of third data buffered by a MAC layer,
wherein the third data is data from the second logical channel.

6. A terminal device, comprising:
a processor; and
a memory communicatively coupled to the processor, the memory storing computer programs that, when executed by the processor, cause the processor to:
receive first uplink resource allocation information sent by a network side device, wherein the first uplink resource allocation information is used to indicate a first uplink resource; and
send a first Medium Access Control Protocol Data Unit (MAC PDU) over the first uplink resource when a size of the first uplink resource is greater than a size of a second MAC PDU previously generated and buffered in a MAC layer buffer or configuration information for resource allocation changes,
wherein the first MAC PDU is a PDU generated through packet assembly based on target data, wherein the target data comprises data content of the previously generated second MAC PDU obtained from the MAC layer buffer and data transmitted from an upper layer to a MAC layer, wherein the data content of the previously generated second MAC PDU and the data transmitted from the upper layer to the MAC layer come from a same logical channel, wherein the upper layer comprises a Radio Link Control (RLC) layer, a Packet Data Convergence Protocol (PDCP) layer, or a Service Data Adaptation Protocol (SDAP) layer,
wherein before the first MAC PDU is sent over the first uplink resource, the processor is further caused to:
generate a same MAC Service Data Unit (SDU) by combining the data content of the previously generated second MAC PDU obtained from the MAC layer buffer and the data transmitted from the upper layer to the MAC layer that are in the same logical channel; or
generate different MAC SDUs from the data content of the previously generated second MAC PDU obtained from the MAC layer buffer and the data transmitted from the upper layer to the MAC layer that are in the same logical channel.

7. The terminal device according to claim 6, wherein the processor is further configured to:
before the first MAC PDU is sent over the first uplink resource, when that the size of a resource allocated to the target data is greater than the size of the target data, pad a MAC PDU generated based on the target data, to obtain the first MAC PDU.

8. The terminal device according to claim 6, wherein the processor is further configured to:
before the first MAC PDU is sent over the first uplink resource, allocate the first uplink resource to a first logical channel;
in the case that the size of a resource allocated to the first logical channel is less than the size of second data buffered by a MAC layer, perform a segmentation operation on the second data buffered by the MAC layer or the second data buffered by the RLC layer, wherein the second data is data from the first logical channel; and
generate the first MAC PDU based on the segmented data.

9. The terminal device according to claim 6, wherein the processor is further configured to:
before the first MAC PDU is sent over the first uplink resource, allocate the first uplink resource to a second logical channel; and
update a variable value of the second logical channel based on a data volume of third data buffered by a MAC layer,
wherein the third data is data from the second logical channel.

10. A non-transitory computer-readable storage medium, storing a computer program, wherein when the computer program is executed by a processor, perform a data transmission method, the data transmission method comprising:
receiving first uplink resource allocation information sent by a network side device, wherein the first uplink resource allocation information is used to indicate a first uplink resource; and
sending a first Medium Access Control Protocol Data Unit (MAC PDU) over the first uplink resource when a size of the first uplink resource is greater than a size of a second MAC PDU previously generated and buffered in a MAC layer buffer or configuration information for resource allocation changes,
wherein the first MAC PDU is generated through packet assembly based on target data, wherein the target data comprises data content of the previously generated second MAC PDU obtained from the MAC layer buffer and data transmitted from an upper layer to a MAC layer, wherein the data content of the previously generated second MAC PDU and the data transmitted from the upper layer to the MAC layer come from a same logical channel, wherein the upper layer comprises a Radio Link Control (RLC) layer, a Packet Data Convergence Protocol (PDCP) layer, or a Service Data Adaptation Protocol (SDAP) layer,
wherein before sending the first MAC PDU over the first uplink resource, the method further comprises:
generating a same MAC Service Data Unit (SDU) by combining the data content of the previously generated second MAC PDU obtained from the MAC layer buffer and the data transmitted from the upper layer to the MAC layer that are in the same logical channel; or generating different MAC SDUs from the data content of the previously generated second MAC PDU obtained from the MAC layer buffer and the data transmitted from the upper layer to the MAC layer that are in the same logical channel.

\* \* \* \* \*